US007059898B2

(12) United States Patent
Barile

(10) Patent No.: US 7,059,898 B2
(45) Date of Patent: Jun. 13, 2006

(54) DIN RAIL LATCHING SYSTEM AND METHOD

(75) Inventor: Dawn M. Barile, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/964,142

(22) Filed: Oct. 13, 2004

(65) Prior Publication Data
US 2006/0079124 A1  Apr. 13, 2006

(51) Int. Cl.
*H01R 13/60* (2006.01)
(52) U.S. Cl. ..................................... 439/532
(58) Field of Classification Search ............. 439/532, 439/717, 716, 76.1; 361/732, 729; 710/13; 403/331, 292
See application file for complete search history.

(56) References Cited

U.S. PATENT DOCUMENTS 5,904,592 A * 5/1999 Baran et al. ................ 439/532
5,907,476 A * 5/1999 Davidsz ...................... 361/732
6,157,287 A * 12/2000 Douglass et al. ............ 337/198
6,431,909 B1 * 8/2002 Nolden et al. ............... 439/532
6,475,036 B1   11/2002 Morikawa

FOREIGN PATENT DOCUMENTS

DE    19748530 C1   2/1999
DE    10012764      9/2001

* cited by examiner

*Primary Examiner*—Alexander Gilman
(74) *Attorney, Agent, or Firm*—Steven M. Haas; R. Scott Speroff

(57) ABSTRACT

A module is adapted to be releasably mounted to a mounting rail such as a DIN rail. The module includes a rail receiving location and first and second latches each movable between a first position where they are retracted from the rail receiving location and a second position where they at least partially obstruct the rail receiving location. The module is selectively attachable to an associated rail located in the rail receiving location by movement of the first and second latches to their respective second positions. One or both of the first and second latches is conformed to capture a projecting portion of an adjacent module when in the second position so as to affix the module and the adjacent module to each other and to the mounting rail.

18 Claims, 6 Drawing Sheets

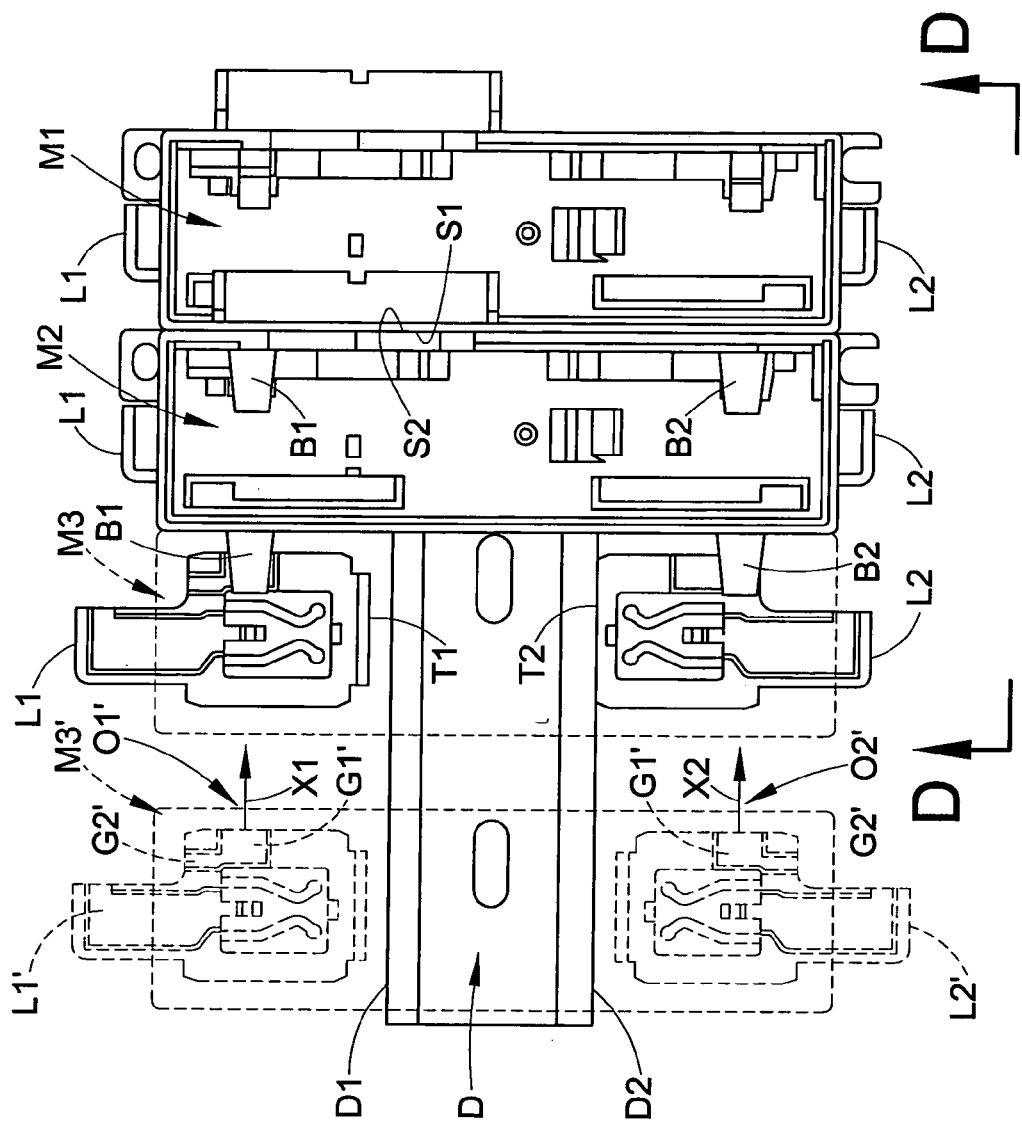
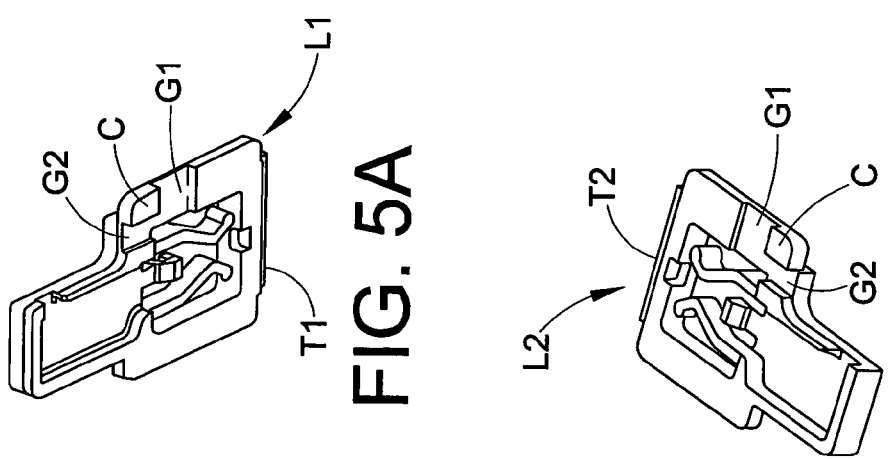

DIN RAIL LATCHING SYSTEM AND METHOD

BACKGROUND

In the industrial automation and other fields, it is common to secure controller and/or other modules to a DIN rail using latches that allow the modules to be selectively removed, replaced, relocated as desired. Such modules can also include a secondary, separably-operable latching system, or secondary locking step, by which each module can be secured to an adjacent module on the DIN rail to ensure good electrical or other operative connection between adjacent modules.

Known latch system have been deemed satisfactory but sub-optimal, and a need has been identified for a more simple and elegant solution for releasably securing modules to a DIN rail and for releasably securing modules to each other when mounted on a DIN rail.

SUMMARY

In accordance with a first aspect of the present development, a DIN rail mounting system comprises: first and second modules each comprising: (i) a DIN rail receiving location; (ii) first and second latches each movable between a first position where they are retracted from said DIN rail receiving location and a second position where they at least partially obstruct said DIN rail receiving location, wherein said first and second modules are selectively attachable to an associated DIN rail located in said DIN rail receiving location by movement of said first and second latches to their respective second positions. The first module further comprises at least one projecting tab that is slidably matable with said second module. The at least one projecting tab is engaged by at least one of said first and second latches when the latch is located in said second position to thus releasably interconnect said first and second modules.

In accordance with another aspect of the present development, a module is adapted to be releasably mounted to an associated DIN rail. The module comprises a DIN rail receiving location and first and second latches each movable between a first position where they are retracted from the DIN rail receiving location and a second position where they at least partially obstruct the DIN rail receiving location. The module is selectively attachable to an associated DIN rail located in the DIN rail receiving location by movement of the first and second latches to their respective second positions. At least one of the first and second latches is conformed to capture a projecting portion of an associated adjacent module when in the second position.

In accordance with an additional aspect of the present development, a method for mounting at least a first module and a second module on a DIN rail comprises placing a first module on a DIN rail and closing first and second latches of the first module to capture the DIN rail to the first module. The method further comprises placing a second module on a DIN rail and moving the second module adjacent the first module on the DIN rail. The method further comprises closing the first and second latches of the second module to capture the DIN rail to the second module and to capture the projecting portion of the first module to the second module.

In accordance with another aspect of the present development, a latching system comprises first and second latches connected to a first module, said first and second latches conformed and adapted to simultaneously engage and capture an associated mounting rail and respective first and second portions of an adjacent second module.

BRIEF DESCRIPTION OF THE DRAWINGS

The development comprises components and arrangements of components, and/or various steps and arrangements of steps, preferred embodiments of which are disclosed herein and shown in the drawings that form a part hereof, wherein:

FIGS. 5A and 5B are isometric views of the upper and lower latches of the DIN rail latching system of the present development;

FIG. 5C is a front elevational view that shows the first and second modules of FIG. 4 mounted to the associated DIN rail and secured to each other, and schematically shows a third module in broken lines (except for the upper and lower latches shown in solid lines) to illustrate operation of the DIN rail latching system (the third module is also shown separately in a pre-installed position);

DETAILED DESCRIPTION

Figure 3:
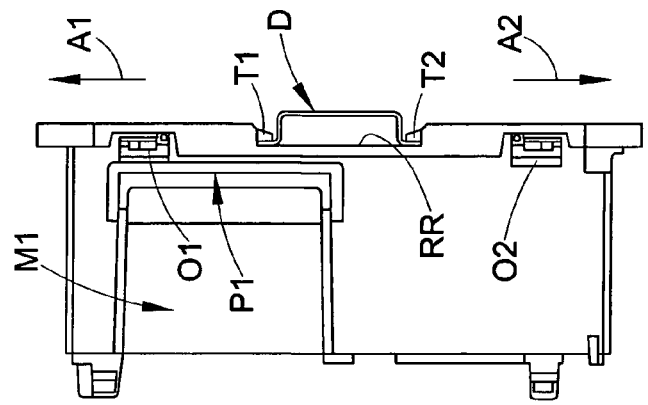
FIGS. 2 and 3 are side elevational views of the module of FIG. 1 as taken respectively along lines 2—2 and 3—3 of FIG. 1.
Figure 1:
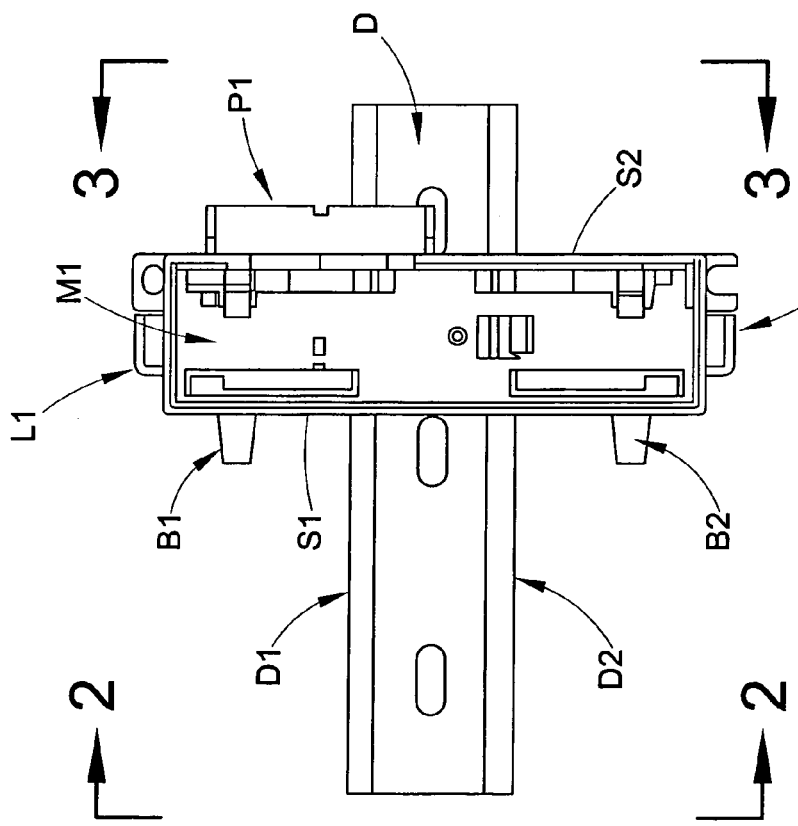
FIG. 1 is a front elevational view of a module including din rail latching system formed in accordance with the present development as mounted on an associated DIN rail.
Figure 2:
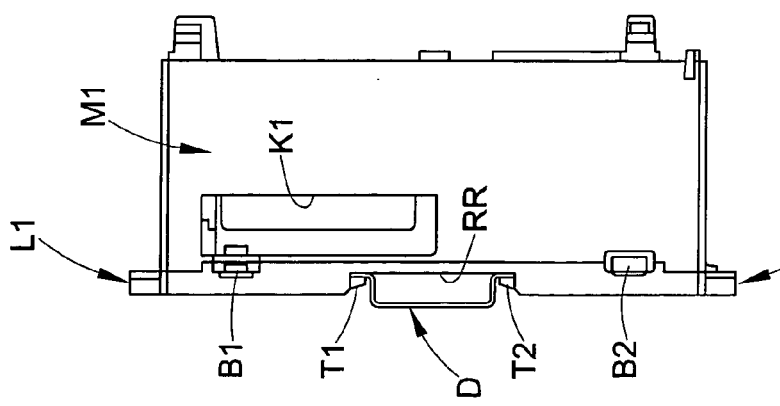

FIGS. 1–3 illustrate a module M1 formed in accordance with the present development as mounted to an associated DIN rail D. The DIN rail D is conventional in all respects and well known in the art and comprises upper and lower parallel axially extending edges D1,D2. The module M1 is typically an electronic module, but can be a pneumatic or hydraulic module or the like without departing from the overall scope and intent of the present invention. The module M1 is shown without its internal circuit boards and without a face plate to facilitate an understanding of the present development.

The module M1 comprises a latching system formed in accordance with the present invention. The latching system comprises a first (upper) latch L1 and a second (lower) latch L2 that selectively engage the DIN rail D to secure the module M1 releasably thereto. The first and second latches L1,L2 are slidably connected to the module M1 for independent movement toward and away from each other between opened (unlatched) and closed (latched) positions in a plane parallel to the rail D. The first latch L1 selectively engages the first edge D1 of the DIN rail and the second latch L2 selectively engages the second edge D2 of the DIN rail.

The module M1 comprises a rail receiving location such as recess RR into which the DIN rail is closely received. The latches L1,L2 are shown in their closed or latched position where the respective tips T1,T2 thereof project into and obstruct the rail receiving recess RR and capture the DIN rail D therein. More particularly, when the latches are closed as shown, the first tip T1 is extended slidably behind the first edge D1 of the DIN rail and the second tip T2 is extended slidably behind the second edge D2 of the DIN rail, so that the DIN rail is captured in the recess RR. As described in further detail below, the latches L1,L2 are selectively manually movable to their respective opened or unlatched positions, where the tips T1,T2 are retracted sufficiently as indicated by the arrows A1,A2 so that they do not obstruct the recess RR sufficiently to capture the DIN rail and so that the DIN rail D is thus freely receivable into and removable from the rail receiving recess RR of the module for mounting/dismounting the module to/from the rail.

The module M1 is typically installed on a DIN rail with at least one adjacent module, with all modules operably (e.g., electrically, pneumatically, hydraulically) connected. The module M1 comprises at least one and preferably first and second tabs B1,B2 that project laterally from a first side S1 thereof. The opposite side S2 of the module M1 defines at least one and preferably first and second openings O1,O2 (FIG. 3) adapted to receive the tabs B1,B2 of an adjacent like module with sliding mating fit as described below so that the tabs B1,B2 overlap the module M1. At least one plug structure P1 also projects laterally from the second side S2 of the module M1, and the first side S1 of the module M1 defines at least one opening or socket K1 conformed and dimensioned to receive the plug structure P1 of an adjacent module with a sliding mating fit, with the pins/contacts or other operative structures (not shown) of the plug P1 and socket K1 making operative mating contact.

Figure 4:
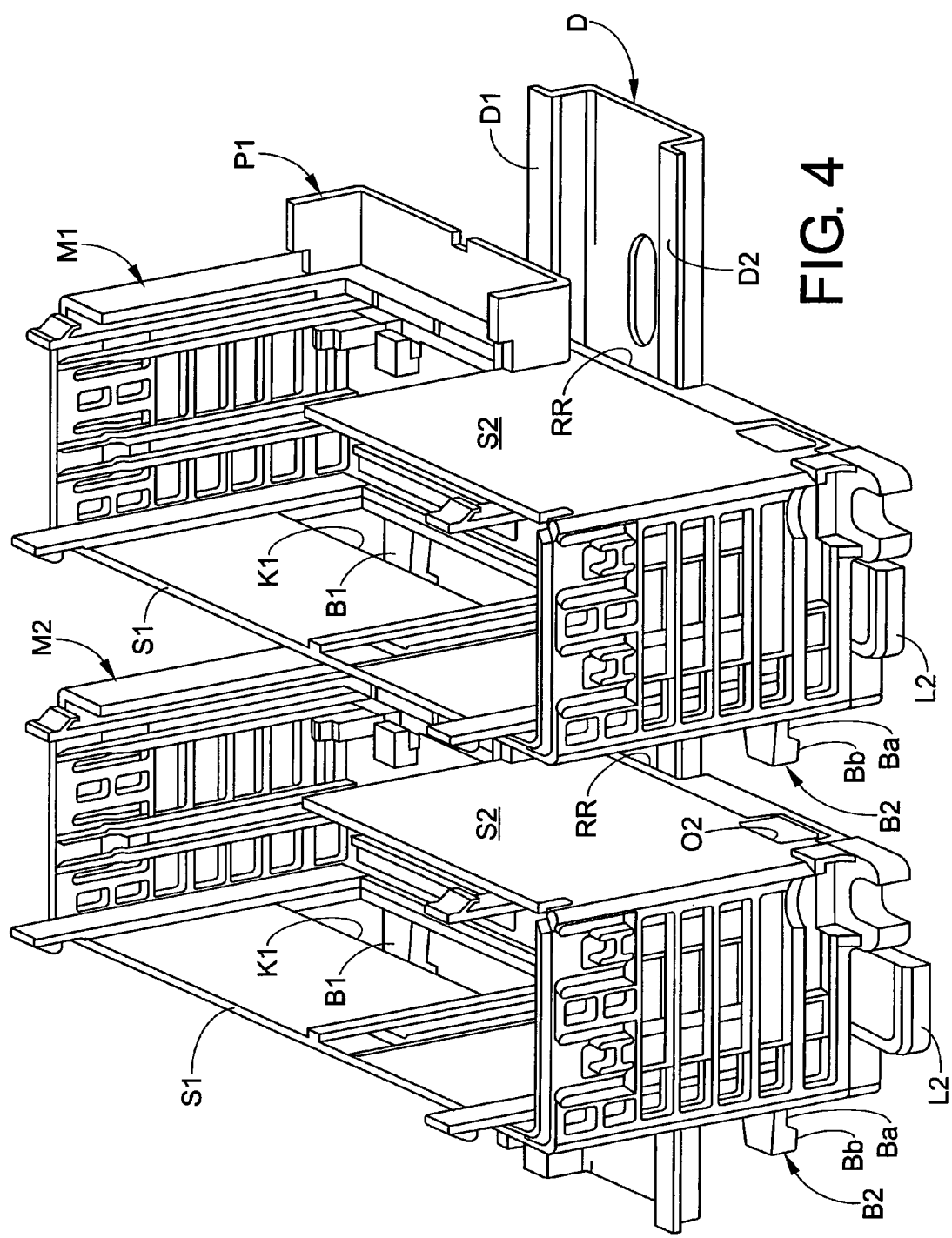
FIG. 4 is an isometric view of first and second modules formed in accordance with the present development and an associated DIN rail and illustrates sliding engagement of the second module with the first module.
Figure 5D:
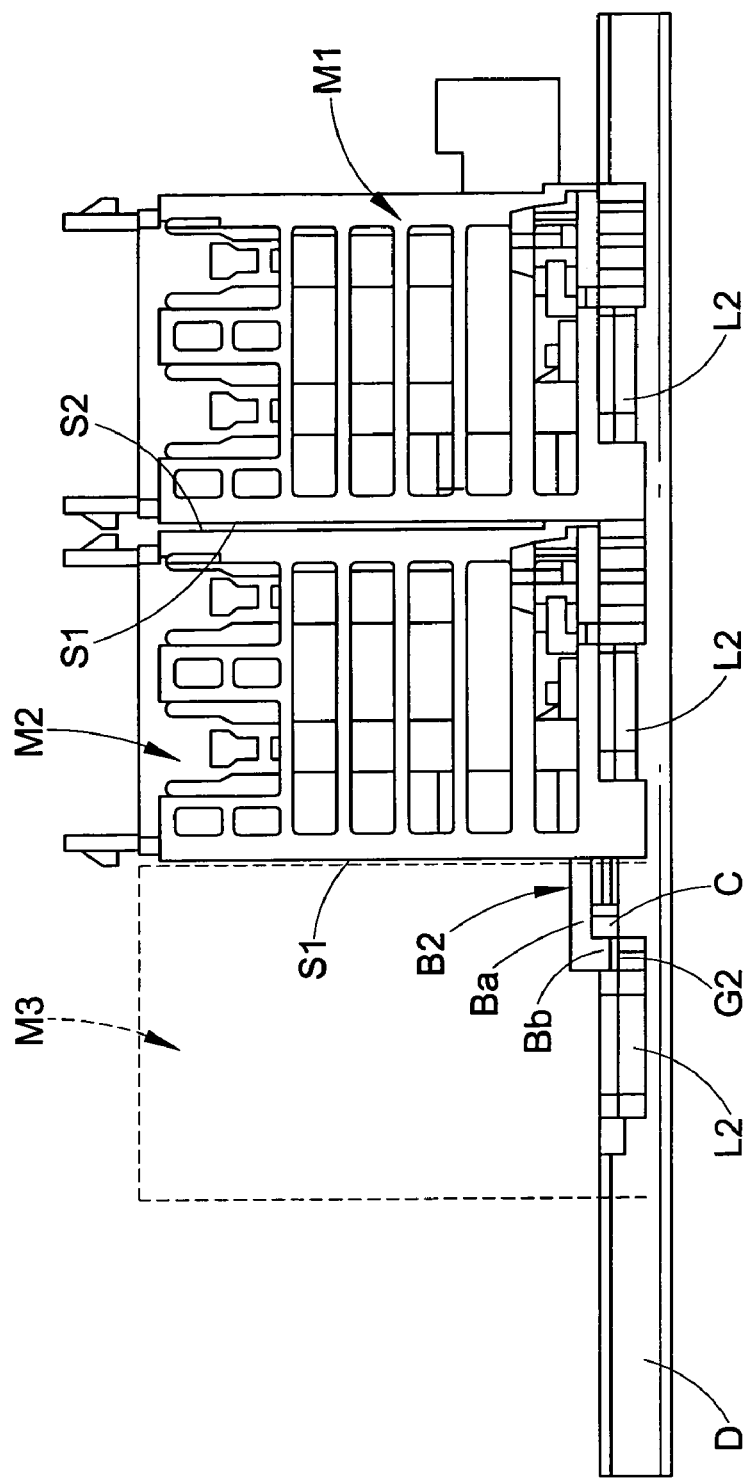
FIG. 5D is a bottom view as taken along line D—D of FIG. 5C.

FIG. 4 illustrates a DIN rail D and the first module M1 and a second module M2. The module M2 is identical to the module M1 insofar as the above-described features of module M1 are concerned, i.e., the features of module M2 relevant to the present development are identical to the same features described in relation to the module M1. The second module M2 will often include different internal circuitry and other components and may include a different face plate and perform a different function as compared to the module M1. The first module M1 is shown as being fixedly secured to the DIN rail D with the latches L1,L2 thereof in the closed position as described in relation to FIGS. 1–3 (only the latch L2 is visible in FIG. 4). The module M2 is engaged with the DIN rail D, i.e., the DIN rail is seated in the recess RR of module M2, but is not yet latched to the rail via latches L1,L2 so that the module M2 can be slidably mated with the module M1. The modules M1,M2 are aligned for mating engagement because the second module M2 is placed on the DIN rail with the rail D fully received in its recess RR. As such, the openings O1,O2 in the side 52 (see also FIG. 3) of module M2 will respectively receive the tabs B1,B2 of module M1, while the opening K1 in the side S1 of module M1 will receive the plug P1 of the module M2. Once the module M2 is mated with the module M1, the latches L1,L2 of the module M2 are also closed to lock the module M2 to the DIN rail as described above in connection with FIGS. 1–3. This fully mated arrangement for the modules M1,M2 is shown in FIGS. 5C and 5D, where it can be seen that the side S2 of module M2 is abutted with side S1 of module M1, with the mating of the tabs B1,B2 of module M1 with openings O1,O2 of module M2 and plug P1 of module M2 with socket K1 of module M1. Any electrical or other operative contacts in the plug P1 and socket K1 will operatively mate when the modules M1,M2 are mated as just described.

A main advantage of the present development relative to known DIN rail latching systems is that at least one and preferably both latches L1,L2 of a second module M2 are adapted to engage a portion of an adjacent first module M1 to fixedly secure the modules to each other as a unit, in one motion. In the illustrated embodiment, the latches L1,L2 of the module M2 are adapted to engage the tabs B1,B2 of the module M1, respectively, in a selectively manner to fixedly secure the modules M1,M2 to each other as a unit on a mounting rail D. This is highly desirable to ensure good operative connection between the modules M1,M2 at the plug/socket interface P1/K1, while not requiring additional separate latches, added latching motions (or steps), or use of screws or other fasteners in addition to the DIN rail mounting latches L1,L2.

The tabs B1,B2 projecting from a module M1,M2 are designed to be selectively engaged by the latches L1,L2, respectively. In the illustrated embodiment, the tabs B1,B2 are shaped identically and are each defined with a generally L-shaped conformation. With reference to the tabs B2 shown in FIGS. 4 and 5D, the tabs B1,B2 comprise a first leg Ba projecting outwardly from the side S1 of module and a second leg or tip Bb located at the distal end of the first leg Ba and projecting rearwardly toward the rail D or toward the recess RR in which the rail is received).

With particular reference now to FIGS. 5A and 5B, the latches L1,L2 are shown separately and each comprises an L-shaped groove comprising a first portion G1 arranged (in use) parallel to the rail D and a second portion G2 that transversely intersects the first portion G1. The second groove portion G2 is arranged (in use) parallel to the axis on which the latches L1,L2 slidably move between their opened and closed positions. The grooves G1,G2 thus define a corner block C at their intersection.

FIG. 5C illustrates first and second modules M1,M2 fully installed on the DIN rail D and latched thereto and to each other by the latches L1,L2 thereof. Specifically, the latches L1,L2 of the modules M1,M2 are in their closed positions to engage the DIN rail, and the latches L1,L2 of the second module M2 are also engaged with the tabs B1,B2, respectively, of the module M1. A third module M3 (also identical to the modules M1,M2 insofar as the present development is concerned) is partially installed on the rail and partially connected to the module M2. The module M3 is shown partially in broken lines to reveal operation of the latches L1,L2 thereof. As shown, the latch L2 is closed and engaged with the rail D and also engaged with and capturing the tab B2 of module M2. The latch L1 is shown in its opened position, but movement of the latch L1 to its closed position will cause the tip T1 thereof to engage the rail D and will result in the tip Bb of tab B1 being captured in the groove G2 of the latch L1.

Prior to being positioned as illustrated, the module M3 was located as shown at M3', seated on the rail, with its latches L1',L2' opened. In this position, the grooves G1' of latches L1',L2' are aligned respectively with the openings O1',O2' of module and also are aligned with tabs B1,B2 of module M2. In this state as shown at M3', the module can be slid on the rail D as indicated by the arrows X1,X2 until the module is located as shown at M3, at which time the latches L1,L2 are moved to their closed positions to capture the tips Bb of tabs B1,B2, respectively, in the transverse grooves G2 of the latches L1,L2. The selective capturing of the tabs B1,B2 by the latches L1,L2 can be understood further with reference to FIG. 5D where it can be seen that the transversely extending tip Bb of tab B2 is located in groove G2 of latch L2 and trapped behind the corner block C so that the corner block prevents sliding movement of the modules M2,M3 apart from each other on rail D. A corresponding relationship occurs for a latch L1 and a tab B1. The spaced-apart relationship of the tabs B1,B2 for each module is advantageous in that the tabs are located on opposite sides of the DIN rail D so as to ensure that the modules are secured together on opposite sides of the DIN rail. Another main advantage of the present development is that the tabs B1,B2 of a first module M1,M2,M3 cannot be slidably mated into the openings O1,O2 of a second module M1,M2,M3 unless the latches unless the latches L1,L2 of the second module are in their opened position, i.e., the corner blocks C of latches L1,L2 obstruct openings O1,O2, respectively, when the latches are closed. This requires the latches L1,L2 to be fully opened in order to mate adjacent modules, otherwise, a visible gap exists between modules, alerting the installer that the modules are not fully mated together.

Figure 6A:
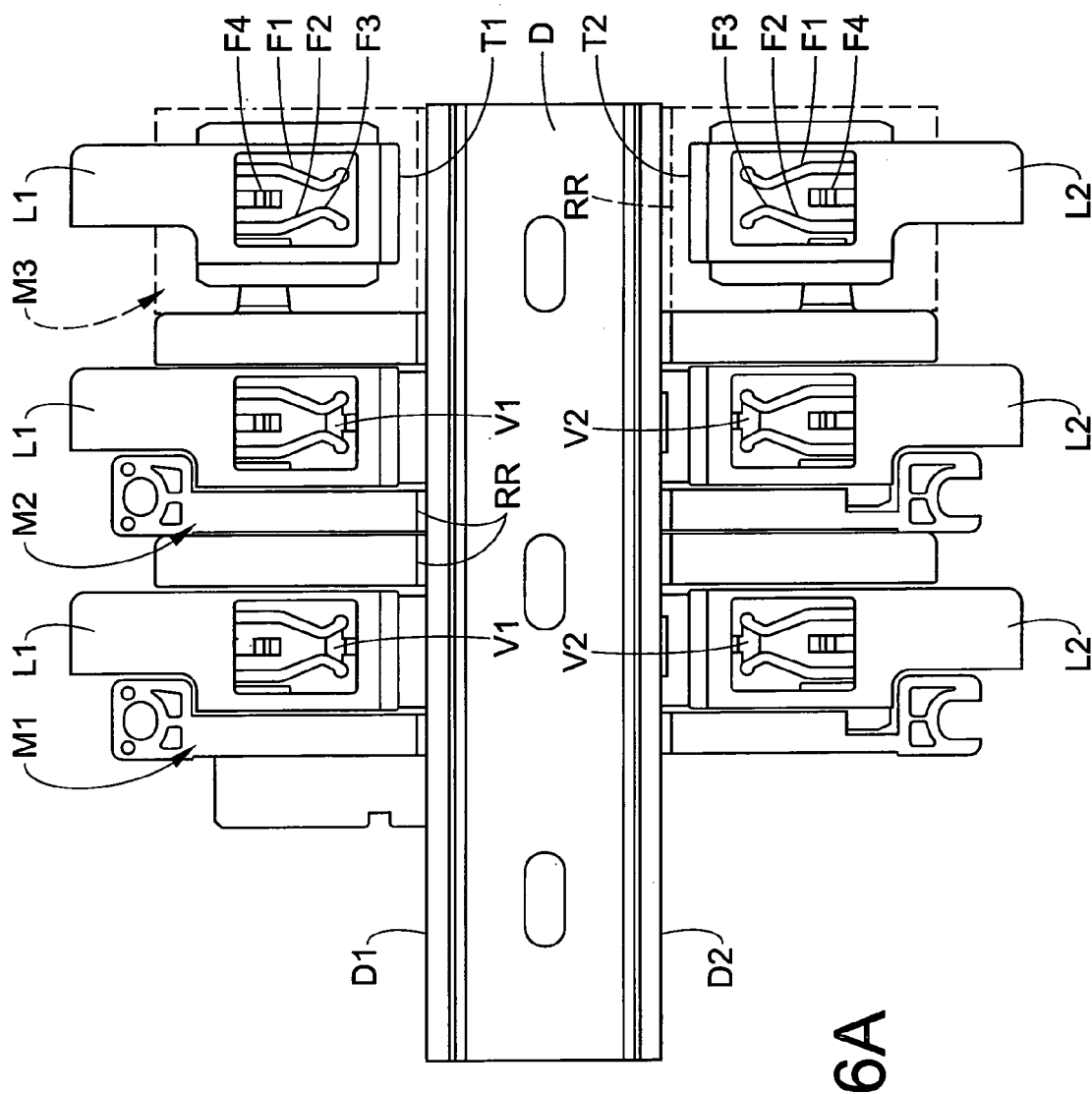
FIG. 6A is a rear elevational view showing three modules (one shown schematically in broken lines) formed in accordance with the present development positioned adjacent an associated DIN rail, with the latches of their respective latching systems in the opened position.
Figure 6B:
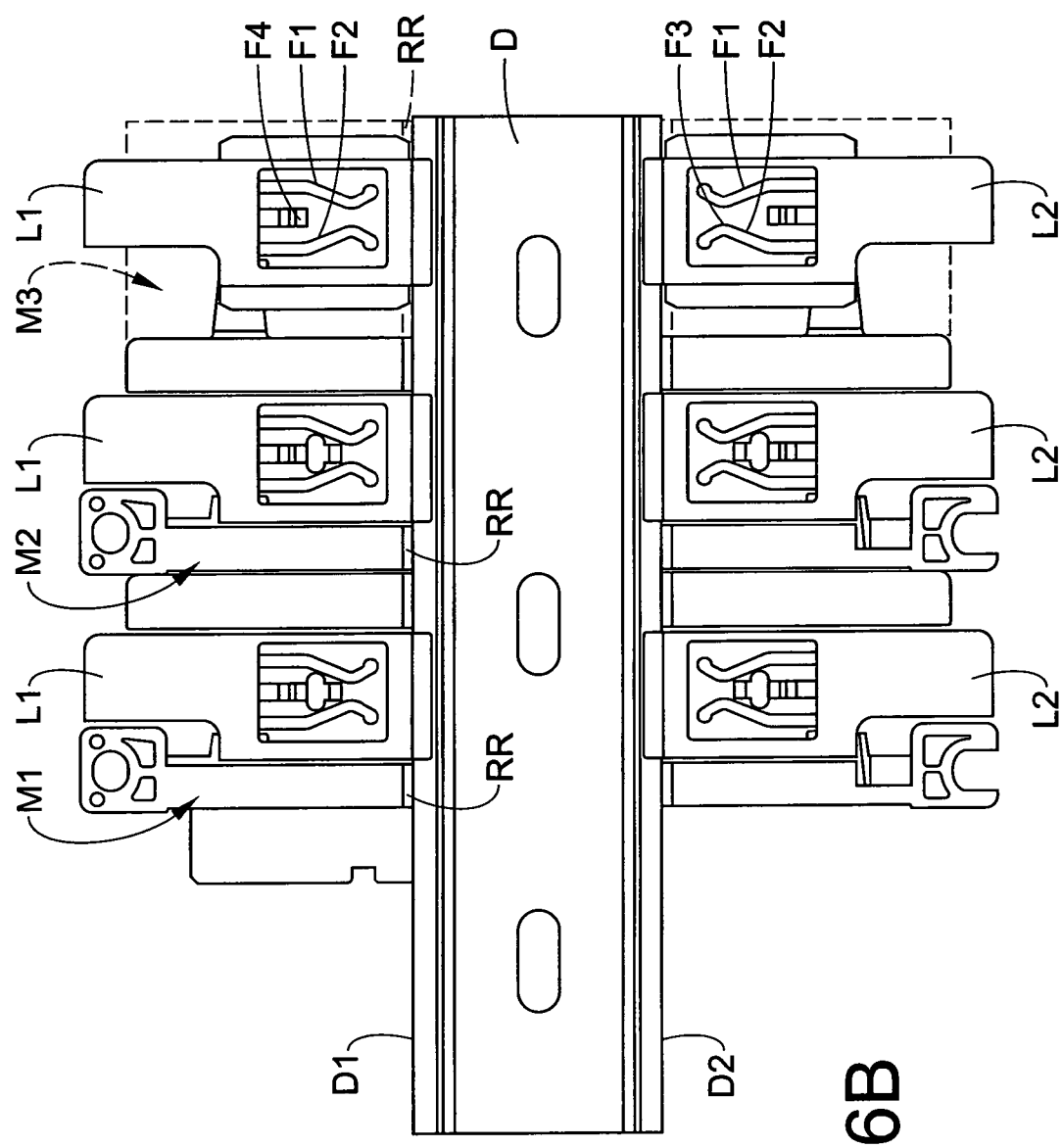
FIG. 6B is similar to FIG. 6A, but shows the latches all in the closed position so as to secure the modules to each other and to associated DIN rail.

FIGS. 6A and 6B show a rear view of the modules M1,M2,M3 and the associated DIN rail D. The modules are shown as seated on the rail D, with the rail located in the recesses RR thereof. Both latches L1,L2 of each module M1,M2,M3 are open. FIG. 6B is identical to FIG. 6A, except that the latches L1,L2 of all modules are closed. As such, in FIG. 6B, all modules M1,M2,M3 are individually latched to the rail D, and are also interconnected to each other in that the latches L1,L2 of module M2 are engaged with and have captured the tabs B1,B2 of module M1, and the tabs B1,B2 of module M2 are engaged and captured by the latches L1,L2 of module M3.

FIGS. 6A and 6B also illustrate that the latches L1,L2 each include resilient fingers F1,F2 that are preferably defined as a one-piece molded plastic construction therewith. The modules M1,M2,M3 (not shown for module M3) comprises first and second immovable studs V1,V2 that are located between the fingers F1,F2 of each latch. By comparing FIGS. 6A and 6B, it can be seen that upon sliding movement of the latches L1,L2 to and between their opened and latched positions, the studs V1,V2 must pass between a restricted neck region F3 defined between the fingers so that the fingers are urged resiliently outward away from each other. The fingers F1,F2 then resiliently return to their normal position as the sliding motion of the latches L1,L2 is completed. Also, when the latches L1,L2 are moved fully to the latched position, a stop portion F4 thereof is stopped against the studs V1,V2, respectively. This action of the fingers F1,F2 relative to the studs V1,V2 provides a tactile feedback to a user upon manual movement of the latches L1,L2 with respect to the proper and full movement of the latches from their opened positions to their closed positions or in the opposite direction. The fingers F1,F2 and studs V1,V2 also serve to hold the latches L1,L2 in their opened or closed positions until sufficient manual force is exerted thereon and urge the latches L1,L2 against the DIN rail D. The fingers F1,F2, neck region F3, stop F4 and studs V1,V2 are conventional and are generally known in the art.

The invention has been described with reference to preferred embodiments. Modifications and alterations will occur to those of ordinary skill in the art, and it is intended that the claims be construed literally and/or according to the doctrine or equivalents to encompass all such modifications and alterations.

What is claimed is:

1. A DIN rail mounting system comprising:
   first and second modules each comprising: (i) a DIN rail receiving location; (ii) first and second latches each movable between a first position where they are retracted from said DIN rail receiving location and a second position where they at least partially obstruct said DIN rail receiving location, wherein said first and second modules are selectively attachable to an associated DIN rail located in said DIN rail receiving location by movement of said first and second latches to their respective second positions;
   said first module further comprising at least one projecting tab that is slidably matable with said second module, wherein said at least one projecting tab is engaged by at least one of said first and second latches of said second module when said at least one of said latches is located in said second position to thus releasably interconnect said first and second modules.

2. The DIN rail mounting system as set forth in claim 1, wherein said second module further comprises at least one projecting tab that is slidably matable with a third module, wherein said third module comprises: (i) a DIN rail receiving location; (ii) first and second latches each movable between a first position where they are retracted from said DIN rail receiving location and a second position where they at least partially obstruct said DIN rail receiving location, wherein said third module is selectively attachable to an associated DIN rail located in said DIN rail receiving location by movement of said first and second latches thereof to their respective second positions, wherein said at least one projecting tab of said second module is selectively engaged and captured by at least one of said first and second latches of said third module when said at least one of said latches is located in said second position to thus releasably interconnect said second and third modules.

3. The DIN rail mounting system as set forth in claim 1, wherein:
   the DIN rail receiving location of said first module is defined by a first recess, and wherein said first and second latches of said first module comprise respective tips that project into said first recess when said first and second latches are located in their second positions and that are retracted from said first recess when said first and second latches are located in their first positions; and,
   the DIN rail receiving location of said second module is defined by a second recess, and wherein said first and second latches of said second module comprise respective tips that project into said second recess when said first and second latches are located in their second positions and that are retracted from said second recess when said first and second latches are located in their first positions.

4. The DIN rail mounting system as set forth in claim 1, wherein the first and second latches of each of the first and second modules are independently movable to and between their first and second positions.

5. The DIN rail mounting system as set forth in claim 1, wherein:
   said at least one projecting tab of said first module comprises first and second spaced-apart tabs;
   said first tab is engaged and captured by said first latch of said second module when said first latch is located in its second position; and,
   said second tab is engaged and captured by said second latch of said second module when said second latch is located in its second position.

6. The DIN rail mounting system as set forth in claim 5, wherein said first and second tabs of said first module are located on opposite sides of said DIN rail receiving location.

7. The DIN rail mounting system as set forth in claim 5, wherein the first and second tabs of the first module are L-shaped.

8. The DIN rail mounting system as set forth in claim 5, wherein said first and second tabs of said first module are only slidably matable with said second module when said first and second latches of said second module are located in their respective first positions.

9. The DIN rail mounting system as set forth in claim 8, wherein said second module comprises first and second openings defined in a lateral side thereof and into which said first and second tabs are respectively received when said first and second modules are mated.

10. The DIN rail mounting system as set forth in claim 5, wherein said first and second latches of said second module each define an L-shaped groove comprising a first groove portion and a transverse second groove portion, wherein said first groove portions of said first and second latches receive the first and second tabs, respectively, when the latches are in their first positions and said first and second tabs of said first module are slidably mated with said second module, and wherein the second groove portions of said first and second latches receive and capture tip portions of the first and second tabs, respectively, when the latches are moved from their first positions to their second positions.

11. The DIN rail mounting system as set forth in claim 10, wherein said first and second latches of said second module each further comprise a corner block defined at the intersection of the first and second groove portions, said corner blocks of said first and second latches preventing separation of said first and second modules from each other by capturing the tips of the first and second tabs, respectively.

12. A module adapted to be releasably mounted to an associated DIN rail, said module comprising:
a DIN rail receiving location;
first and second latches each movable between a first position where they are retracted from said DIN rail receiving location and a second position where they at least partially obstruct said DIN rail receiving location, wherein said module is selectively attachable to an associated DIN rail located in said DIN rail receiving location by movement of said first and second latches to their respective second positions, and wherein said first and second latches are conformed to receive respective first and second projecting portions of an associated adjacent module when in their first positions and to capture the respective first and second projecting portions of the associated adjacent module when in their second positions;
said module defining first and second openings adapted to receive the first and second projecting portions of the associated adjacent module, wherein said first and second latches respectively obstruct the first and second openings when located in their respective second positions.

13. The module as set forth in claim 12, wherein:
the DIN rail receiving location of said module is defined by a first recess, and wherein said first and second latches of said module comprise respective tips that project into said recess when said first and second latches are located in their second positions and that are retracted from said recess when said first and second latches are located in their first positions.

14. The module as set forth in claim 12, wherein the first and second latches are independently movable to and between their first and second positions and are independently engageable with the first and second projecting portions of the associated adjacent module.

15. A module adapted to be releasably mounted to an associated DIN rail, said module comprising:
a DIN rail receiving location;
first and second latches each movable between a first position where they are retracted from said DIN rail receiving location and a second position where they at least partially obstruct said DIN rail receiving location, wherein said module is selectively attachable to an associated DIN rail located in said DIN rail receiving location by movement of said first and second latches to their respective second positions, and wherein said first and second latches are conformed to receive respective first and second projecting portions of an associated adjacent module when in their first positions and to capture the respective first and second projecting portions of the associated adjacent module when in their second positions,
wherein said first and second latches of said module each define an L-shaped groove comprising a first groove portion and a transverse second groove portion, wherein said first groove portions of said first and second latches are adapted to receive the associated first and second projecting portions, respectively, when the latches are in their first positions, and wherein the second groove portions of said first and second latches receive and capture the associated first and second projecting portions, respectively, when the latches are moved from their first positions to their second positions.

16. The module as set forth in claim 15, wherein said first and second latches of said module each further comprise a corner block defined at the intersection of the first and second groove portions, said corner blocks of said first and second latches adapted to capture the first and second associated projecting portions, respectively.

17. A method for mounting at least a first module and a second module on a DIN rail, said method comprising:
placing a first module on a DIN rail;
closing first and second latches of the first module to capture the DIN rail to the first module;
placing a second module on a DIN rail;
moving said second module adjacent said first module on said DIN rail;
closing first and second latches of the second module to capture the DIN rail to the second module and to capture a portion of the first module to the second module, wherein:
said portion of said first module captured to the second module comprises first and second tabs;
said first and second tabs are received into said second module when said second module is moved adjacent said first module; and,
wherein said step of closing first and second latches of the second module to capture the DIN rail to the second module comprises capturing the first tab to the first latch and capturing the second tab to the second latch.

18. The method as set forth in claim 17, wherein said step of closing first and second latches of the first module to capture the DIN rail to the first module is carried out after said step of closing first and second latches of the second module.

* * * * *